United States Patent [19]

Hodge

[11] 4,212,512
[45] Jul. 15, 1980

[54] FIBER OPTIC COUPLER FOR TAPPING INTO FIBER OPTIC LINE

[75] Inventor: Malcolm H. Hodge, Claymont, Del.
[73] Assignee: TRW Inc., Elk Grove Village, Ill.
[21] Appl. No.: 879,162
[22] Filed: Feb. 21, 1978
[51] Int. Cl.² .............................................. G02B 5/14
[52] U.S. Cl. ........................... 350/96.15; 350/96.16
[58] Field of Search ................ 350/96.15, 96.16, 96.17

[56] References Cited

U.S. PATENT DOCUMENTS

| | | | |
|---|---|---|---|
| 3,870,396 | 3/1975 | Racki et al. | 350/96.16 |
| 3,874,779 | 4/1975 | Thiel | 350/96.16 |
| 3,883,217 | 5/1975 | Love et al. | 350/96.16 |
| 3,912,364 | 10/1975 | Hudson | 350/96.16 |
| 3,937,560 | 2/1976 | Milton | 350/96.16 |
| 4,089,583 | 5/1978 | Auracher et al. | 350/96.15 |

FOREIGN PATENT DOCUMENTS 2299656  8/1976  France .................. 350/96.16

OTHER PUBLICATIONS

Y. Ueno and N. Oogi "The 2 Data Highway Using Optical Fiber Cable," Conference on Laser & Electro-Optical Systems, May 1976.
Fujita, Suzaki & Tachibana, "Optical Fiber Wave Splitting Coupler," Applied Optics, vol. 15, No. 9, Sep. 1976, pp. 2031–2032.
Barnoski & Morrison, "Angle Selection Fiber Coupler," Applied Optics, vol. 15, No. 1, Jan. 1976, pp. 253–255.
Winn and Harris, "Coupling from Multi-Mode to Single Mode . . . ," IEEE Trans on Microwave Theory, vol. MTT-23, No. 1, Jan. 1975, pp. 92–97.
McMahon & Gravel, "Distributive Tee Couplers," Applied Physics Letters, vol. 28, No. 7, Apr. 1976, pp. 396–398.
Suzuki and Kashiwagi, "Concentrated Type Directional Coupler for Optical Fiber," Applied Optics, vol. 15, No. 9, Jan. 1976, pp. 2032–2033.
Advertisement for Siemens GmbH, Electro-Optical Systems Design, Sep. 1977, p. 14.
Taylor, Caton & Lewis, "Data Busing with Fiber Optics," Naval Research Reviews, vol. 28, No. 2, Feb. 1975, pp. 12–25.

*Primary Examiner*—Rolf G. Hille
*Attorney, Agent, or Firm*—Neuman, Williams, Anderson & Olson

[57] ABSTRACT

Light distributing coupler means are provided for use in an optic fiber transmission system having a first, second, third and fourth optical fibers. The distributing means is arranged to couple light signals between a first fiber and a co-axially aligned, spaced second fiber and a laterally offset third fiber. The distributing means is an elongated, cylindrical, light transmissive member whose cross-sectional area and shape is approximately equal to the combined cross-sectional area and shape of the second and third fibers. The coupler is arranged to be disposed within a guide element, with the first and fourth fibers abutting one end of the coupler and with the second and third fibers abutting the other end thereof.

17 Claims, 9 Drawing Figures

U.S. Patent  Jul. 15, 1980  4,212,512
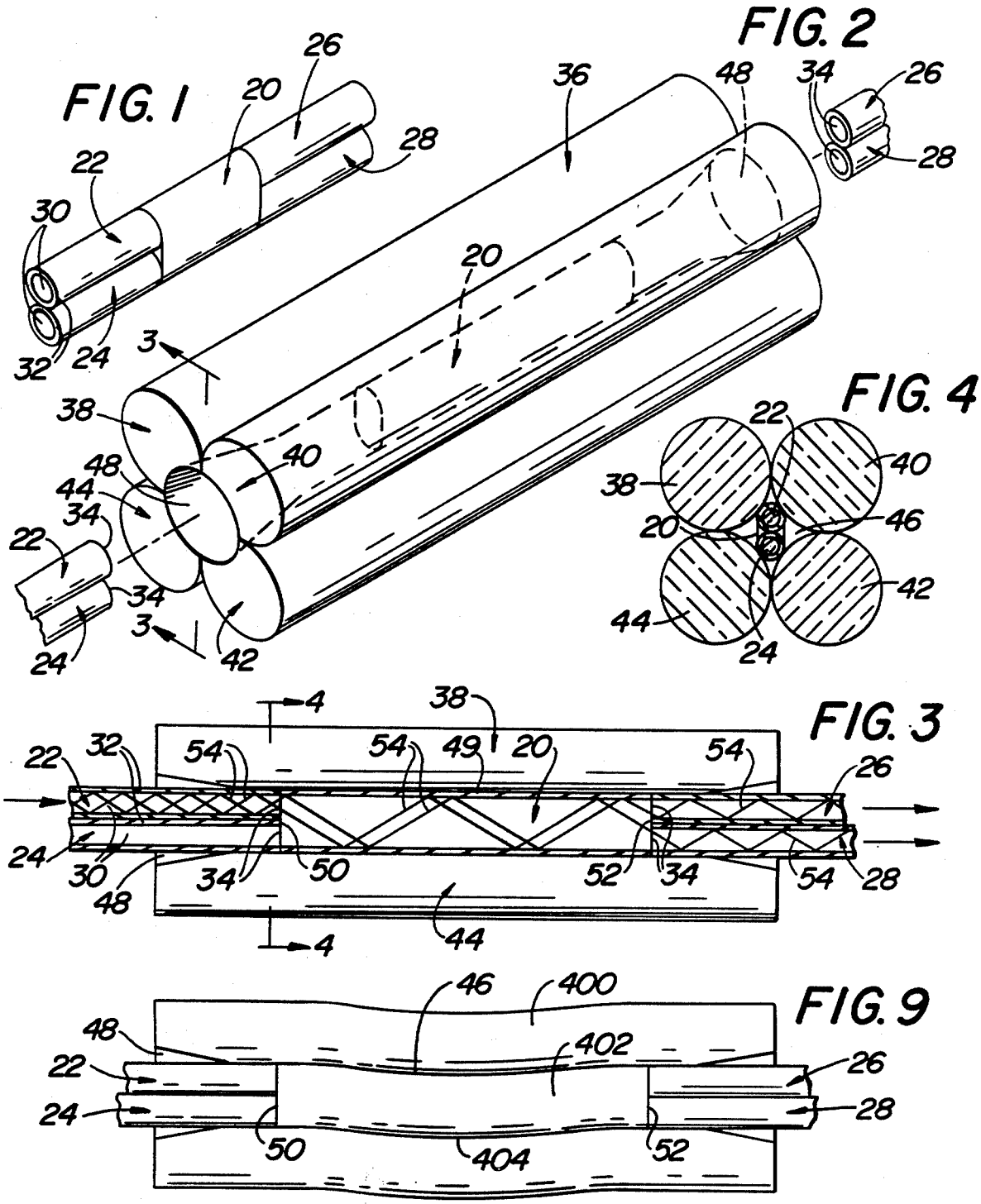
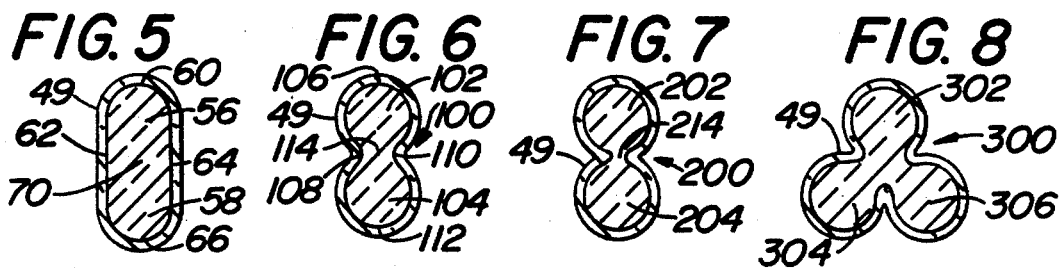

FIBER OPTIC COUPLER FOR TAPPING INTO FIBER OPTIC LINE

This invention relates to optical fiber transmission systems and more particularly to devices for tapping off part of a signal or feeding a signal into a fiber optic transmission line.

Recently various techniques have been proposed in the literature for tapping off part of a light signal or inserting a light signal into a fiber optic transmission line. It should be pointed out at this juncture that in the context of this invention the term light is understood to be generic of ultraviolet, visible and infrared portions of the electro-magnetic spectrum.

Among the various techniques for tapping or injecting light signals into fiber optic transmission systems disclosed in the prior art are the following: In systems using plastic-clad optical fibers, a portion of the cladding is removed and brought into contact with an unclad portion of another fiber. This technique has been utilized by Bell Telephone Laboratories. Another technique inovlves the welding of a pair of fibers to the end of one fiber to form a generally Y-shaped coupler. This technique has been described in a letter entitled "Optical Fiber Wave Splitting Coupler" by Fujita, Suzaki and Tachibana appearing in Volume 15, No. 9, Applied Optics (September, 1976) on page 2031. Another technique entails the use of a coupler having four lenses and a coupling prism to which the fibers are connected. The lenses illuminate the prism, which takes light from associated input fibers and presents fractions of it, via each of its output faces to the associated output fibers. This technique has been disclosed by Y. Ueno and N. Oogi in their paper "THE 2", Conference on Laser and Electro Optical Systems held in May, 1976 in San Diego, CA. A still further technique for tapping an optical fiber involves the use of a tapered section of a fiber which is immersed in a fluid having a higher refractive index than the core so that some rays exceed the internal reflection angle at the core-cladding interface and pass therethrough into an auxiliary or tapping fiber. This technique has been disclosed in an article entitled "Angle Selection Fiber Coupler" by M. K. Barnodei and R. J. Morrison appearing in Applied Optics, Volume 15, No. 1, January, 1976 at page 253. A still further technique involves the stripping of cladding from a ribbon array of optical fibers and the abutting of a tapered glass slab at the portions of the stripped-away cladding. This technique has been disclosed in an article entitled "Distributive T Couplers" by D. H. McMahon and R. L. Gravel appearing in Applied Physics Letters, Volume 28, No. 7, Apr. 1, 1976 at page 396.

Other disclosures relating to prior art techniques are an article entitled "Coupling From Multi-Mode To Single-Mode Linear Wave Guide Using Horn-Shaped Structures" by Robert K. Winn and J. H. Harris appearing in IEEE Transactions On Microwave Theory And Techniques, Volume MTT-23, No. 1 January, 1975 at page 92; and a letter entitled "Concentrated-Type Directional Coupler For Optical Fibers" by Yoshihiro Suzuki and Hiroshi Kashiwagi appearing in Applied Optics, Volume 15, No. 9, January, 1976 at page 2032. Siemens GmbH has disclosed an optical distributor using a light sensitive plastic foil corresponding to the diameter of the fiber to form a branching structure. The branching structure requires the two ends of a cut fiber to meet with a slight offset. The light component which escapes at the interface of the offset enters the distributor and is guided along a curve therein to a branching fiber. This technique is shown in Electro-Optical Systems Design, September, 1977, on Page 14.

In U.S. Pat. No. 3,882,217 there is disclosed an optical communication system for interconnecting a plurality of remotely controlled stations and which utilizes a light mixing coupler which is interposed between optical wave guide bundles. The coupler is in the form of a transparent rod.

In U.S. Pat. No. 3,912,364 there is disclosed a mixer for multifiber optical waveguide bundles. The mixer comprises a hollow member into which the end portions of two, multifiber optical waveguide input bundles are disposed. The end portions of the two bundles are located within a ferrule with their end surfaces coplanar and with the longitudinal axis of each of the bundles being parallel. The end of a multifiber optical waveguide output bundle is disposed within a ferrule mounted in the hollow member with its end surface being located opposite the end surfaces of the two input bundles. A refracting lens is mounted in the hollow member between the opposed bundle ends to refract the light from either of the two input bundles to uniformly illuminate the end face of the output bundle.

In U.S. Pat. No. 3,870,396 there is disclosed a coupler for extracting a portion of a light signal from a first optic fiber transmission line while enabling the remainder of said signal to pass to a second optic fiber transmission line and for coupling an entire input light signal, via a third optic fiber from input means, e.g., a light emitter, to the second transmission line. In one embodiment the coupler includes a transparent sheet disposed at an acute angle to the axis of the first and second optic fibers and a pair of right angle prisms. One prism and the transparent sheet form an optical interface reflecting a portion of the light signal from the first optic fiber to output means, such as a light detector, via a fourth optic fiber, while the remainder of the signal is refracted by said components and passes into a tapered transparent rod to the first optic fiber transmission line. The light from the input means, is carried by a third optic fiber to the coupler where it is reflected at the optical interface formed between the other prism and the transparent sheet and the light passes through the prism into the tapered rod and to the second transmission line.

In U.S. Pat. No. 3,874,779, there is disclosed a coupler similar to that disclosed in U.S. Pat. No. 3,870,396.

In U.S. Pat. No. 3,937,560 there is disclosed a coupler for a fiber optic transmission system. The coupler includes a first lens disposed adjacent to a first optic fiber for collimating the light signal therefrom and into one end of a transparent block having a reflective surface therein at a forty-five degree angle to the axis of the first optic fiber. A second lens is disposed adjacent to an opposed end of the block for collimating the light therethrough into the end of an aligned second optic fiber. The reflective surface acts to reflect the portion of the light from the first lens out of the block while also reflecting an input signal from another optic fiber into a second lens and hence the second optic fiber.

While all of the above techniques exhibit some utility for the coupling of a light signal from one fiber to another, such techniques suffer from one or more drawbacks from the standpoint of simplicity, efficiency, cost effectiveness, etc.

Accordingly, it is a general object of the instant invention to provide a coupler for distributing signals from one optic fiber to another and which overcomes the disadvantages of the prior art.

It is a further object of the instant invention to provide a coupler for tapping off part of the signal or feeding a signal into a fiber optic transmission line and which is simple in construction.

It is a further object of the instant invention to provide a coupler for fiber optic transmission systems for effecting the tapping off of part of a light signal or feeding a light signal into a fiber optic transmission line and which exhibits very low loss.

These and other objects of the instant invention are achieved by providing in a fiber optic transmission system including at least a first, a second, a third and a fourth optical fiber, distributing means for coupling light between the first fiber and the second and third fibers. Each of the fibers has an end portion terminating in a flat end. The ends of the first and second fibers are spaced apart and co-axially aligned. The ends of the third and fourth fibers are spaced apart and co-axially aligned. The end of the third fiber lies immediately adjacent laterally from the end of the second fiber and the end of the fourth fiber lies immediately adjacent laterally from the end of the first fiber. The distributing means is an elongated cylindrical light transmissive member having a first and a second end and being interposed between the fibers, with the first end of the distributing means in abutment with the ends of the first and fourth fibers and with the second end of the distributing means in abutment with the ends of the second and third fibers. The cross-sectional area and shape of the first end of the distributing means is substantially equal to the combined cross-sectional area and shape of the ends of the first and fourth fibers and the cross-sectional area and shape of the second end of the distributing means is substantially equal to the combined cross-sectional area and shape of the ends of the first and third fibers.

Other objects and many of the attendant advantages of the instant invention will be readily appreciated as the same becomes better understood by reference to the following detailed description when considered in connection with the accompanying drawing wherein:

FIG. 1 is a perspective view of a light distributing coupler in accordance with the instant invention interposed between two pairs of conventional optical fibers;

FIG. 2 is an exploded perspective view of the coupler shown in FIG. 1 disposed within a fiber optic guide assembly for receipt of the optic fibers shown in FIG. 1;

FIG. 3 is a sectional view taken along line 3—3 of FIG. 2;

FIG. 4 is a sectional view taken along line 4—4 of FIG. 3;

FIG. 5 is a cross-sectional view of one coupler in accordance with the instant invention;

FIG. 6 is a sectional view similar to FIG. 5 but of an alternative embodiment of the coupler of the instant invention;

FIG. 7 is a cross-sectional view, like that of FIGS. 5 and 6, but of yet a further alternative embodiment of the instant invention;

FIG. 8 is a cross-sectional view, like FIGS. 5, 6 and 7 but showing a still further embodiment of the coupler of the instant invention; and FIG. 9 is a sectional view of an alternative guide holding an alternative embodiment of the coupler of the instant invention.

Referring now in greater detail to the various figures of the drawing wherein like reference characters refer to like parts, a light distributing coupler is shown generally at 20 in FIG. 1.

The embodiment of the coupler shown in FIG. 1 is arranged to take a light signal from one of two incoming optical fibers 22 or 24 and to divide it and distribute it to a pair of outgoing optical fibers 26 and 28, while maintaining representative signals, albeit weaker ones, in the exiting fibers.

The fibers 22, 24, 26 and 28 are each of conventional construction and each includes a central glass core 30 with a glass cladding 32 deposited thereabout, which cladding has a lower refractive index than that of the core, to prevent light loss along the length of the fiber. The end of each fiber is cleaved squarely at 34.

It should be pointed out at this juncture that the optical fibers 26 or 28 may serve as the input fibers of the system, while the fibers 22 and 24 serve as the output fibers. In either of the two described cases the coupler serves to divide and distribute a light signal to plural fibers. As noted heretofore, the coupler 20 is also suitable for merging signals from plural input fibers to a single output fiber. In this connection, respective signals may be provided through input fibers 22 and 24 to the coupler 20 for channelling to either output fiber 26 or 28 or the light signals may be provided through fibers 26 and 28 to the coupler for channeling to either fiber 22 or 24.

As will be described in detail later, all the couplers of this invention are geometrically matched to the cross-section of the input and output fibers. This feature ensures that light loss is kept to a minimum across the fiber-to-coupler interface and also enables the connection between the input and output fibers to be accomplished within a light guide assembly, such as the type forming the subject of my co-pending U.S. Patent Application Ser. No. 758,106, filed on Jan. 10, 1977, assigned to the same assignee as the instant invention, and whose disclosure is incorporated by reference herein.

In FIG. 2 there is shown a guide assembly 36 in accordance with the teachings of my aforenoted patent application and which is eminently suitable for holding the coupler 20 and aligning it with respect to the four fibers 22–28 to effect a good low light loss interface. To that end, the guide assembly 36 comprises four glass rods 38, 40, 42 and 44. The rods are disposed in a side-by-side array parallel to one another and with longitudinal peripheral portions of adjacent rods in contact and connected to each other to form a cusp-shaped interstitial channel 46 (FIG. 4) therebetween. As can be seen in FIGS. 2 and 3, the cusp-shaped channel 46 has a flared mouth 48 at each end of the guide assembly 36. The flared mouth 48 facilitates the insertion of the coupler 20 and the fibers into the channel 46 to align such components.

As can be seen in FIGS. 1 and 3, the light distributing coupler 20 is an elongated cylindrical member, preferably formed of a glass core having a conventional low index glass cladding 49 thereon and of the same thickness as the cladding on the fibers. The term cylindrically, as used herein, is defined in its broad sense, namely, any solid bounded by two planes and a portion of a closed cylindrical surface, i.e., the surface generated by a straight line which moves so that it always intersects a given plane curve (called the directrix) and remains parallel to the fixed line or central axis that intersects the plane of the directrix. In accordance with a preferred aspect of the invention the cross-sectional area and shape of the coupler 20 is constant throughout its length. The coupler includes an opposed pair of flat ends 50 and 52 which are adapted to abut the ends of the input and output fibers, respectively. As noted heretofore, the coupler is geometrically matched to the cross-sectional area of the input and output fibers. By geometrically matched it is meant that the cross-sectional area of each end 50 of the core of the coupler 20 is substantially the same size and same shape as the combined cross-sectional areas of the ends of the cores of the abutting fibers.

The coupler 20, when disposed within the guide assembly 38 and abutted by a pair of input fibers 22 and 24 and a pair of output fibers 26 and 28, like shown in FIG. 4, is arranged to distribute light rays received from either input fiber 22 or 24 to both output fibers 26 and 28. Since only one input fiber is used to carry a signal the other input fiber merely serves as a dummy to help maintain the signal carrying input fiber in position. Assuming that fiber 22 is the signal carrying input fiber, light rays 54 passing therealong exit the fiber through the interface of its end 34 and the contiguous portion of the end 50 of the coupler 20. The beams reflect internally within the coupler, exiting at its rear face 52 and into the abutting ends of the output fibers 26 and 28. Since the cross-sectional area of the coupler is greater than that of the input fiber and substantially the same as the combined cross-sectional area of the two output fibers, the light beams 54 which enter the input fiber 22, and which normally would pass only to an aligned output fiber if the coupler were the same cross-sectional area as the aligned output fiber, reflect back and forth across the cross-section of the coupler to exit at a location which is aligned with the input fiber and a location laterally offset therefrom. The beams exiting at the aligned location are available for direct ingress into the aligned output fiber 26, while the beams exiting the coupler at the laterally offset location are available for direct ingress into the offset output fiber 28.

The proportion of the light rays which are distributed by the coupler 20 to the aligned output fiber 26 and the offset output fiber 28 is a function of the geometry of the cross-sectional area of the coupler.

The coupler 20 shown in FIG. 1 can be considered to consist of two basic portions, an upper portion or lobe 56, which is aligned with the input fiber 22 and the aligned output fiber 26 and a lower portion or lobe 58 which is aligned with the offset output fiber 28. The cross-section of the upper lobe is bounded by a semi-circular surface 60 and a pair of parallel planar surfaces 62 and 64. One planar surface extends tangent to one end of the semi-circular surface 60 while the other planar surface extends tangent to the other end of the semi-circular surface 60. The lower lobe 58 is bounded by an opposed semi-circular surface 66, with the ends thereof terminating tangentially in the planar surfaces 60 and 62.

As can be seen in FIG. 5, the width of the interface 70 of the coupler between its upper and lower lobes is equal to the spacing between planar surfaces 62 and 64 and is hence equal to the diameter of the core 30 of each fiber.

As should be appreciated by those skilled in the art, light rays entering the face of the upper lobe 56 from fiber 22 are enabled to reflect internally back and forth down the coupler to exit in approximately equal portions through the end surface 52 of the upper and lower lobes 56 and 58, respectively, which surfaces are contiguous with output fibers 26 and 28, respectively. Accordingly, the light provided by the input fiber 22 is equally divided by the coupler 20 of FIG. 5 between the output fibers 26 and 28.

In FIG. 6 there is shown the cross-section of an alternative coupler 100 in accordance with the instant invention. The coupler shown in FIG. 6 is arranged to provide a greater portion of light to the aligned output fiber 26 than to the offset output fiber 28. To that end, as can be seen in FIG. 6, the coupler 100 is an elongated cylindrical member consisting of an upper lobe 102 which is arranged to be aligned with the input fiber 22 and the aligned output fiber 28, and a lower lobe 104 which is arranged to be aligned with the offset output fiber 28. The cross-section of the upper lobe is bounded by a circular surface 106 extending at least 270°. One end of the circular surface 106 merges into a concave surface 108 and the other end of the surface 106 merges into an opposed concave surface 110. The lower lobe 104 is bounded by an opposed corresponding sized circular surface 112 having a pair of ends merging into the concave surfaces 108 and 110, respectively. The diameter of each lobe is the same as the diameter of the core of the optic fibers 22–28. The interface 114 between the upper and lower lobes is defined by the spacing between the concave surfaces 108 and 110 and is thus less than the diameter of either lobe. Accordingly, a lower proportion of light rays gain ingress into the lower lobe 104 from the upper lobe at which they enter. Therefore, a greater proportion of light rays exit the coupler 100 through the upper lobe interface into the aligned optic fiber 26 than enter the offset fiber 28 through its interface with the lower lobe 104.

In FIG. 7 there is shown yet an alternative embodiment of a coupler in accordance with the instant invention. In the embodiment shown in FIG. 7 the coupler 200 is of the same general shape as the coupler 100 except that the interface 214 between the upper lobe 202 and the lower lobe 204 is smaller than the interface 114 of the coupler 100. As should thus be appreciated by those skilled in the art, the coupler 200 is suitable for providing an even greater portion of the light rays to its aligned output fiber than to its offset output fiber 28.

Like the coupler 20, the couplers 100 and 200 are each clad at 49.

In FIG. 8 there is shown another coupler 300 in accordance with the instant invention. The coupler 300 includes three lobes 302, 304 and 306, each of which is constructed similarly to lobes 102 and 104 of the coupler 100. The coupler 300 is suitable for use in systems wherein the light from one or two input fibers is to be distributed to three output fibers or vice versa.

In my co-pending U.S. Patent Application Ser. No. 838,350, filed on Sept. 30, 1977, assigned to the same assignee as the instant invention and whose disclosure is incorporated by reference herein, there is disclosed a fiber optic connection guide formed of at least three pre-determined length rods which are disposed in a side-by-side array parallel to one another, with longitudinal peripheral portions of adjacent rods in contact and connected to each other to form a cusp-shaped interstitial channel therebetween. The channel includes a pair of open ends and an arcuate portion between the ends. This arrangement ensure a superior fiber-to-fiber connection by creating a bias within the alignment body.

In FIG. 9 there is shown a four rod guide 400 constructed in accordance with the teachings of said patent application and in which is disposed a coupler 402 for coupling light signals between fibers 22-26. The coupler 402 is constructed in accordance with the teachings of this application but instead of being a linear cylindrical element, like couplers 20, 100, 200 and 300, it includes an arcuate portion 404 between its ends 50 and 52. The arcuate or curved portion of the coupler ensures that it is held elastically within the guide 400.

It should be pointed out at this junction that while it is preferable to have the end surface of each signal-carrying optic fiber actually abutting the associated end of the coupler to minimize the light loss across the interface therebetween, such an arrangement is not crucial to the instant invention. In this regard the end surface of any or all of the signal-carrying optic fibers may be spaced from the coupler and the coupler will still perform its intended light distribution function on a viable basis, providing the end surface of the fiber is in such close proximity to the end of the coupler that the light loss across the interface is no greater than ten (10) db.

In addition, while the couplers of the instant invention may be made of any suitable light transmissive material, it is preferred that they be made of glass, for precision, each of manufacture, high tolerance, high inertness, and wide temperature range tolerance.

As will be appreciated by those skilled in the art, the couplers of the instant invention can be made inexpensively and are readily adaptable to different numbers of fibers, from two upward, with ready means of fiber refractive index matching. In addition, since the couplers of the instant invention match the active area of the output fibers, the couplers allow precise control over the degree of crosstalk between the output fibers by the mere selection of the shape of the coupler. The control over crosstalk between output fibers is accomplished irrespective of the length of the coupler so long as it is substantially longer than the cone of acceptance of the input fiber. In accordance with a preferred embodiment of this invention the coupler is approximately 0.25 inch (6.35 mm) long, thereby being at least 1.5 orders of magnitude larger than the cone of acceptance of a conventional optical fiber. Another important advantage of the geometric matching of the coupler area to that of the output fibers is that when the coupler is interposed between the input and output fibers a low loss connection results.

Without further elaboration, the foregoing will so fully illustrate my invention that others may, by applying current or future knowledge, readily adapt the same for use under various conditions of service.

What is claimed as the invention is:

1. In a fiber optic transmission system for transmitting desired portions of light signals between ends of at least one optical fiber and at least two spaced optical fibers, the improvement comprising distributing means for coupling light between and interfacing with the ends of such fibers and having a transverse sectional configuration substantially uniform throughout the length thereof which is determinative of the light distribution between such optical fibers interfacing with said distributing means; said transverse sectional configuration being defined by first and second longitudinal lobes having opposed end surfaces each of which is for interfacing with and effecting a light signal transmissive connection with an optical fiber end; said distributing means having an interconnecting portion between said first and second lobes predeterminately formed for determining the proportion of light passing between said first and second distributing means lobes when a light signal is passed through at least one of said lobes.

2. The system of claim 1 wherein optical fibers are in light signal transmissive engagement with each end of said distributing means; said optical fibers havng end surfaces which are geometrically matched with the interfacing ends of the distributing means effecting light signal transmissive connections therewith.

3. The system of claim 2 in which said distributing means and optical fibers are located in a cusp-shaped interstitial channel defined by a plurality of cylindrical surfaces; said cusps aligning said distributing means first and second lobes at opposed ends with an optical fiber central longitudinal axis.

4. In a fiber optic transmission system, at least one optical fiber having one end in spaced relation with the ends of at least two optical fibers and adapted to have light signals pass therebetween; distributing means for coupling light between the ends of said one and said two optical fibers and disposed therebetween; said distributing means having opposed ends interfacing with ends of said at least one fiber and said at least two fibers; said distributing means having a first light conducting lobe extending the length of said distributing means interfacing with and effecting light signal transmissive connections with ends of said one optical fiber and a first one of the two spaced fibers at opposed ends of said first lobe; said distributing means having a second light-conducting lobe extending the length of said distributing means interfacing with an end of a second one of said two spaced fibers and effecting a light signal transmissive connection therewith; said distributing means having an interconnecting portion between said first and second lobes integrally formed with and extending the length of said first and second lobes; said interconnecting portion being predeterminately formed for determining the amount of light passing from one of said coupler light conducting lobes to the other along the lengths of said lobes when a light signal is passed along the length of at least one of said lobes.

5. In a fiber optic transmission system for transmitting desired portions of light signals between at least one optical fiber and at least two optical fibers spaced from said one fiber, the combination comprising discrete light transmissive distributing means for optically coupling optical fibers; said distributing means having opposed end surfaces for engaging end surfaces of optical fibers to be coupled; said distributing means having a transverse sectional configuration determinative of the light distribution between optical fibers coupled thereby; said transverse sectional configuration being defined by a first lobe and a second lobe of said distributing means for interfacing with and effecting light-transmissive connections with optical fiber ends at opposed ends of each of said lobes; said distributing means having an interconnecting portion interposed said first and second lobes of predetermined configuration for allowing desired light passage between said first and second portions; guide means formed of cylindrical guide surfaces defining a cusp-shaped interstitial channel for reception of said distributing means; said channel having cusps locating said distributing means in said channel; said channel being of such length and sectional configuration as to position said distributing means in a first portion thereof intermediate the channel ends and receive a plurality of optical fibers engaging opposed ends of said distributing means in spaced channel portions on opposite sides of said first channel portion.

6. The system of claim 5 wherein optical fibers are present in said interstitial channel and located by the cusps therein whereby optical fiber ends are guided into abutting, signal transmissive connections with opposed ends of said distributing means.

7. The system of claim 5 wherein said interstitial channel of said guide means is curved whereby said distributing means is elastically held in fixed position within said guide channel.

8. In a fiber optic transmission system for transmitting optic signals between at least one optical fiber and a spaced plurality of optical fibers, each of said fibers terminating in end surfaces at opposed end limits; the combination comprising at least one optical fiber having one end in spaced relation with the ends of a plurality of optical fibers; distributing means of substantially uniform cross-section for coupling light disposed between the ends of said spaced fibers; said distributing means comprising a light transmissive member having opposed ends; said member being formed by a first elongate lobe and a second elongate lobe extending substantially coextensively with said first lobe, said light transmissive member also including an interfacing portion extending between said first and second lobes; said interfacing portion being determinative of the amount of light cross talk between said lobes; an optical fiber engaging in a signal transmissive connection with each end of said first and second lobes of said light transmissive member; the cross-sectional area and shape of each end of the lobes being substantially equal to the cross-sectional area and shape of a fiber end with which engaged in a signal transmissive connection.

9. The system of claim 4, 5, or 8 wherein the cross-sectional area and shape of both ends of the distributing means is the same.

10. The system of claim 4, 1, 5 or 8 wherein the cross-section of the ends of the distributing means is bounded by an opposed pair of semi-circular arcs, whose opposed ends are joined by respective, parallel straight lines.

11. The system of claim 4, 1, 5 or 8 wherein the cross-section of the ends of the distributing means is bounded by an opposed pair of arcs, each of said arcs being circular and extending at least 270°, with the opposed ends of said arcs being joined by respective concave lines.

12. The system of claim 4, 1, 5 or 8 wherein the cross-section of the ends of the light distributing means is bounded by at least a first and a second arc, each of said arcs being circular and extending at least 270°, with the end of the first arc being joined to the end of the second arc by a first concave line and with the other end of the second arc being connected to the other end of the first arc by a second line.

13. The system of claim 12 wherein said second line is concave.

14. The system of claim 4, 1, 5 or 8 wherein the cross-section of the ends of the distributing means is also bounded by a third arc extending at least 270° and wherein said second line comprises a second concave line, said third circular arc, and a third concave line.

15. The system of claim 4 or 8 wherein each of said fibers is coated with a light transmissive coating of a lower refractive index than said fibers and wherein said light distributing means is coated with a light transmissive coating of a lower refractive index than said distributing means.

16. The system of claim 4, 1, 5 or 8 wherein said distributing means is formed of glass.

17. The system of claim 4, 1, 5 or 8 wherein said light distributing means includes an arcuate portion between its first and second ends.

* * * * *